United States Patent [19]

Weiss

[11] 3,938,296
[45] Feb. 17, 1976

[54] ELEMENTS FOR CONNECTING BOARDS OR PLATES

[76] Inventor: Gil Weiss, 229 Nir-Zvi, Ramle, Israel

[22] Filed: May 13, 1974

[21] Appl. No.: 469,151

Related U.S. Application Data

[63] Continuation-in-part of Ser. No. 310,316, Nov. 29, 1972, abandoned.

[52] U.S. Cl. .................. 52/753 C; 52/760; 52/582; 403/161; 403/406; 297/440; 312/263
[51] Int. Cl.² ........................................ F16B 12/12
[58] Field of Search .......... 52/753 C, 753 D, 753 R, 52/753 F, 758 D, 760, 582, 285, DIG. 10; 16/170, DIG. 13, 128; 297/440; 211/148; 312/363; 403/362, 161, 406

[56] References Cited
UNITED STATES PATENTS

| 1,742,141 | 12/1929 | Hicks | 52/753 C X |
| 2,362,904 | 11/1944 | Kramer | 312/263 UX |
| 2,495,632 | 1/1950 | Hansen et al. | 211/148 UX |
| 3,164,347 | 1/1965 | McMasters | 297/440 X |
| 3,436,047 | 4/1969 | Foltz | 403/362 X |
| 3,732,653 | 5/1973 | Pickett | 52/285 X |
| 3,748,009 | 7/1973 | Stone | 312/263 |

Primary Examiner—Werner H. Schroeder
Assistant Examiner—Wayne L. Shedd
Attorney, Agent, or Firm—Silverman & Cass, Ltd.

[57] ABSTRACT

Elements for connecting boards or plates, the element comprising a ring having a cross section of a three quarter circle extending into a right angle. The ring has a circular opening extending therethrough. The elements are fastened to two or more boards and a rod is removably placed so as to traverse all circular openings of the elements.

14 Claims, 12 Drawing Figures

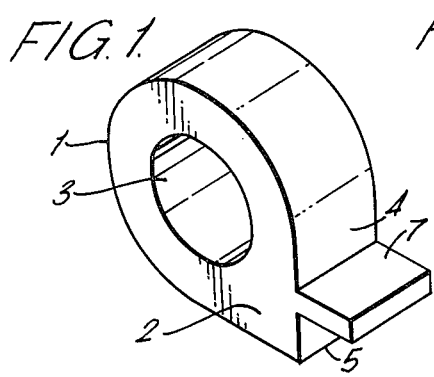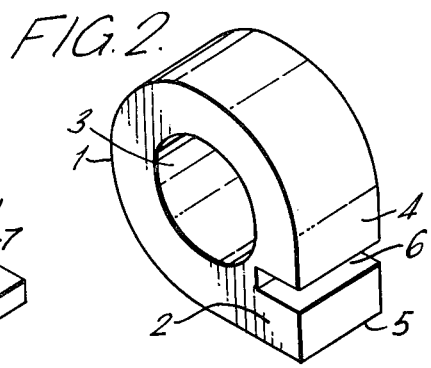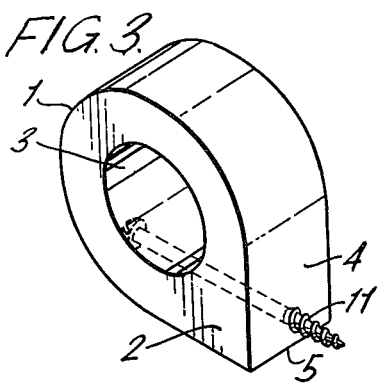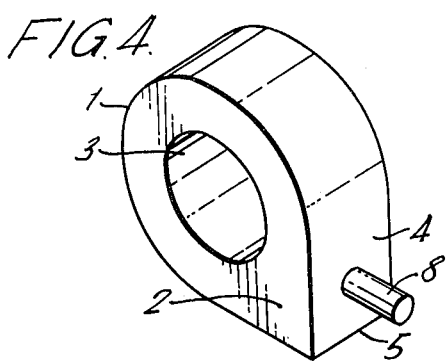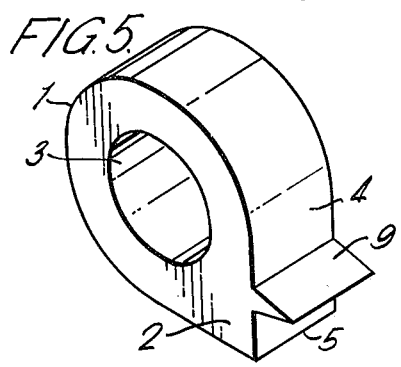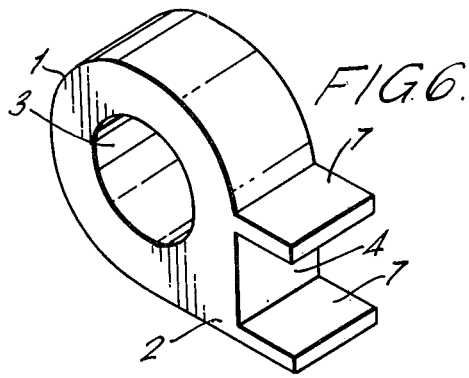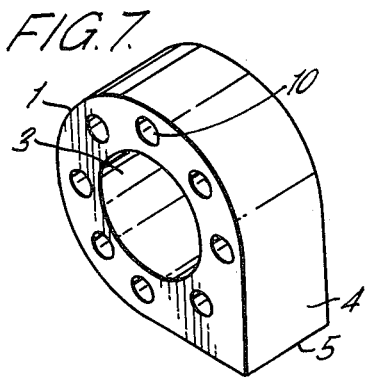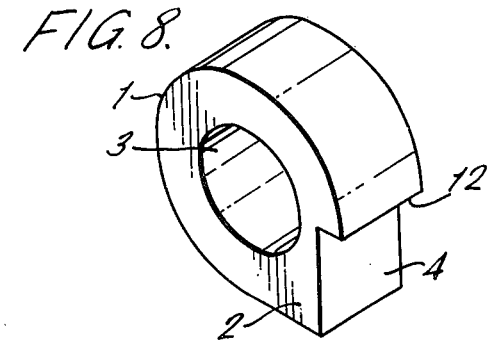

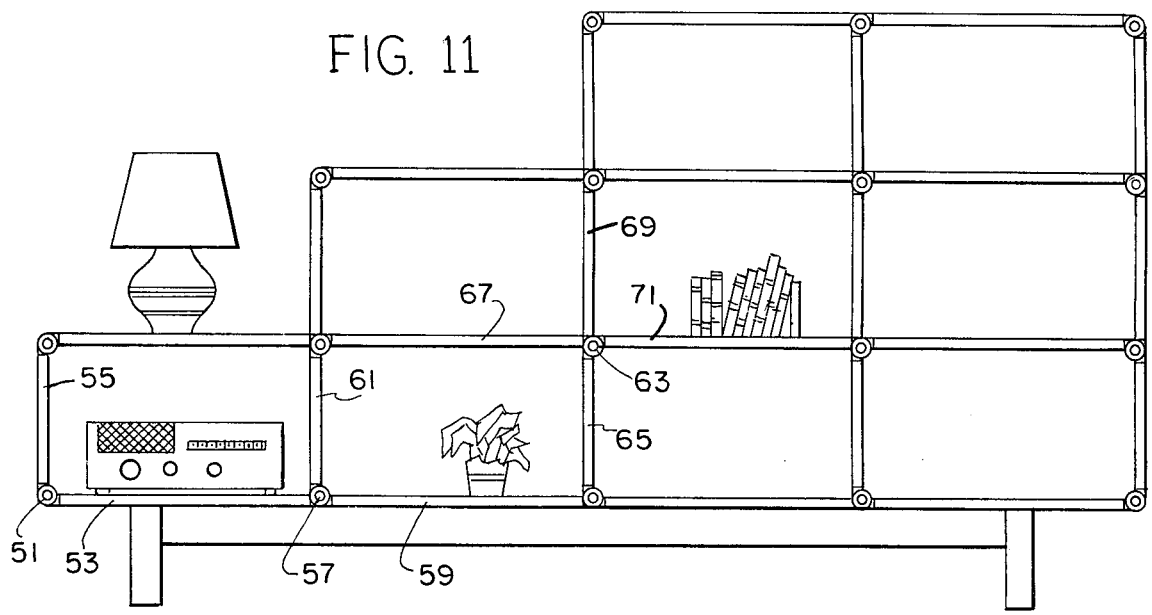
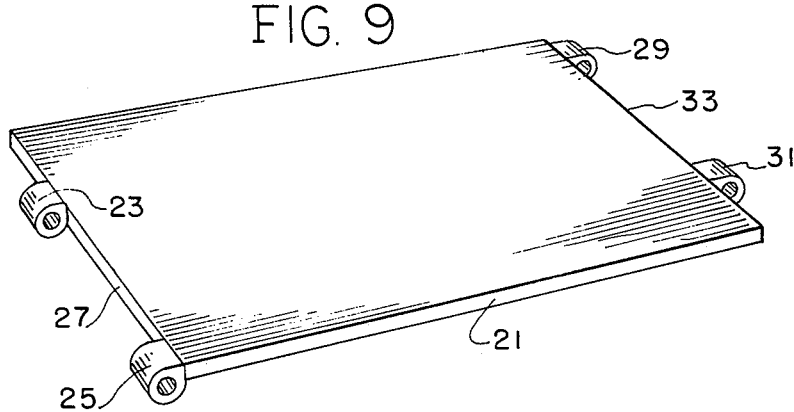
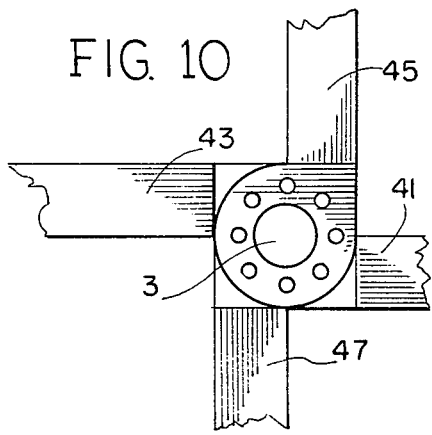
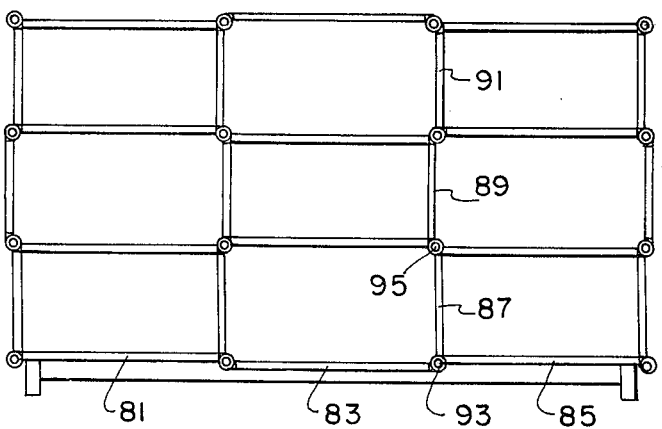

ELEMENTS FOR CONNECTING BOARDS OR PLATES

REFERENCE TO RELATED APPLICATIONS

This is a Continuation-In-Part-Application to my pending application, Ser. No. 310,316, filed Nov. 29, 1972 now abandoned, entitled "Element for the Connection of Rods and Boards and the like arranged thereon, particularly for use in connecting parts of furniture."

BACKGROUND OF THE INVENTION

The invention relates to devices and methods for connecting boards, plates and the like, particularly for use in joining furniture parts to one another in a novel manner.

DESCRIPTION OF THE PRIOR ART

Devices and methods have been known in the past for joining parts of furniture, such as cabinets, chests, desks, dressers, shelves, and the like, the parts including walls, bottoms and tops of seats and back rests of chairs, and the like.

The various furniture parts were connected by means such as screws, bolts, nuts and nails. Other types of connections included pins and holes, tongue and grooves and the like.

It will be appreciated that these connections have certain disadvantages. The parts can only be joined in a predetermined manner. The connections have to be removed when the furniture parts are taken apart, for instance for moving to a new home, and have to be reinserted there except for very bulky pieces of furniture which are transported without being dismantled. Repeated removal and reinsertion of connecting means, such as screws, nails and the like are liable to cause damage, in particular to screw bores and nail holes.

The present invention envisions the provision of elements for the connection of furniture parts which make it possible to connect them in any desired position and in any direction. This is rather important for furniture, such as wall shelves, flower stands, box furniture and the like. Furthermore, the present invention enables ready dismantling of the parts, without having to remove screws or to pull out nails.

In a departure from the known connecting means, the instant invention envisages an element for the connection of plates, boards, and the like, which element is formed of a ring having a cross-section of a three-quarter circle and preferably a right-angular point, the ring being provided with a through-going opening co-axial with the circle, and being of suitable width. The opening is preferably round in cross-section.

SUMMARY OF THE INVENTION

An element for connecting boards or plates with one another. The element has the configuration of a three-quarter ring with tangential surfaces joining in a right angular corner. The ring has a central circular throughgroup opening. In joining a plurality of boards to which the connecting elements are fastened in complementary positions, the joint is secured by a rod through the central openings of the elements.

BRIEF DESCRIPTION OF THE DRAWINGS

FIGS. 1 to 8 illustrate several embodiments of elements according to the invention in perspective views.

FIG. 9 is a perspective view of a board to which connecting elements according to the invention have been fastened on opposite edges thereof.

FIG. 10 is a schematic side view of connecting elements fastened to horizontal and vertical boards and joining same.

FIG. 11 is a front view of a shelf-assembly, the shelves thereof having been joined to one another by the connecting elements according to the invention.

FIG. 12 is a front view of another shelf assembly wherein the shelves are arranged in a slightly off-set manner relative to one another.

DESCRIPTION OF THE PREFERRED EMBODIMENTS

Referring now to FIGS. 1 to 8 of the drawings, the novel element has a cross-section of substantially a three-quarter circle 1 and a right-angular corner 2. Co-axially with the three-quarter circle 1 the element is provided with a preferably circular opening 3. The flat surfaces 4 adjacent the edge 5 serve for abutting the parts to be connected. The element is of desired height. In the embodiment of FIG. 2, a lot 6 is arranged in one of the flat surfaces 4, into which the part to be connected can be inserted having a corresponding projection. The embodiment of FIG. 1 is the reverse of that of FIG. 2. On one of the flat surfaces 4 a right-angular projection is provided which engages a corresponding slot in the part to be connected. The embodiment according to FIG. 4 has on one flat surface 4 a cylindrical plug 8 which engages a corresponding depression in the part to be connected. In the embodiment of FIG. 5 a wedge-like projection is provided, while the embodiment of FIG. 6 has two rectangular projections spaced from one another. A wedge-like projection 9 as shown in FIG. 5 may additionally be arranged between the two projections 7 of FIG. 6. As illustrated in FIG. 7, it is possible, in addition to the throughgoing opening 3 which is co-axial with the circle 1, to provide a plurality of throughgoing circular openings 10 arranged equally spaced on a circle co-axial with the opening 3, the openings 10 having the same diameter. In the embodiment of FIG. 8 one of the flat surfaces 4 is undercut at 12. A somewhat different feature is provided in FIG. 3. A screw 11 is inserted through the element at right angle to one flat surface 4 adjacent opening 3. The screw is adapted to engage the part to be connected.

Furthermore, if desired, one or more sleeve-like projections may be arranged on one or both of flat surfaces 4. Plugs or pinlike projections may be provided in said sleeve-like projections and co-axial therewith.

In the event that the elements are of short height, only one slot such as slot 6 of FIG. 2 or one projection such as projection 7 of FIG. 6 or plug 8 of FIG. 7 may be provided.

FIG. 9 illustrates a board 21 with connecting elements 23,25 fastened thereto at one edge 27, and connecting elements 23,31 fastened to an opposite edge 33. The connecting elements are fastened at the edges spaced from one another in desirable positions. Another board (not shown) which is to be joined to the board 21 will have connecting elements fastened to its edges at positions corresponding to empty spaces on the edges of the board 21.

In order to join two boards, the boards will be placed at a desired angle relative to one another with the central openings 3 of their connecting elements all aligned. A cylindrical rod is inserted in all aligned openings 3, thus making a permanent or pivotable joint between the two boards.

Fastening the connector elements to the boards may be done by one of two methods. The first calls for the use of a connector element which has no recesses nor projections on its surface, such as the type shown in FIG. 7. One of the straight portions 4 is glued to the edge of the board at a predetermined position; preferably two or three such connectors are so glued, all being spaced from each other. A second, or third or fourth board is similarly prepared by glueing the elements thereto. However, their spacings must be staggered relative the other boards so that they form together a continuous row of elements when the boards are joined, wherein the central openings 3 of each connector are aligned. By inserting a cylindrical rod through the central openings of all the connectors, the boards are now connected.

Conversely, by simply removing the rod, they become separate again. It goes without saying, that the same method can be applied to connectors as shown in FIGS. 1–6 and 8, provided the edges of the boards are equipped with projections and recesses, fitting into corresponding recesses or projections to be held therein by friction.

The connector elements are inserted into the preformed edges from the ends thereof, preferably two or three such connectors being left in predetermined positions spaced from one another.

Furthermore, the invention provides for guide rails which are either attached alongside the edges of a board over which the profiled portions of the connectors can be slipped.

The other method provides for slipping onto a circular rod a number of connectors, each in a different position depending on the desired extension of their straight portions, and this in accordance with the number of boards to be connected. Subsequent thereto, another set-or two-of connectors is slipped onto said rod. Thereafter, one board after the other is either inserted into the projections of the connectors which are intended to be attached to it, or is glued to the straight edges of said connectors.

FIG. 10 illustrates in a fractional side view a juncture of boards in which two horizontal boards 41,43 and two vertical boards 45,47 are joined by the novel connector elements the central openings 3 of all connectors being aligned. The fastening of the connector elements to the four boards may have been made by the first or the second method set forth in the preceding paragraphs.

FIG. 11 illustrates a wall shelf assembly which may serve as a furniture piece for placing thereon books, lamps, flowers, a radio set and the like.

It will be noted that the junctures include connections between two, three or four boards.

In particular, juncture 51 connects two boards, 53 and 55. Juncture 57 connects three boards, 51, 59 and 61, while juncture 63 connects four boards, 65, 67, 69 and 71.

All the junctures have been established by one or the other of the methods previously described.

A significant advantage of the invention resides in the fact that the connectors may be so assembled that the horizontal as well as the vertical boards are arranged slightly off-set relative to each other, thus obtaining a particularly decorative construction, as readily seen in FIG. 12 in which boards 81 and 83 are parallel but not aligned, yet boards 81 and 85 are aligned. The same relationship prevails among the boards 87, 89 and 91. This result is achieved by positioning the boards such that for instance in juncture 93 the connector elements of board 83 are directed upwardly, while the elements of board 85 point downwardly. Similarly, in juncture 95, the elements of board 87 are directed to the left while the elements of board 89 are to the right.

Furthermore, the connectors may be slipped on the common cylindrical rod at any desired angular position, so that the straight portions of the elements with or without their projections or recesses may point to different angular positions and, therefore the boards to be connected thereto will assume different angular positions to each other. Thus, the invention makes it possible to obtain furniture of special design which deviates from furniture with known right-angular planes only.

To prevent the elements from rotating on the rod, a fixing pin may be inserted through the element, as indicated in FIG. 3. The element is expediently made of wood, but it may also be made of plastic and the like material.

What is desired to secure by Letters Patent of the United States is:

1. An element for connecting boards or plates, with one another, said element comprising a ring having a cross-section of three-quarter of a circle with a right angular point, the straight sides thereof tangentially joining the ends of the three-quarter circle, said element including a throughgoing opening co-axial with the ring, for receiving a rod for enabling said straight sides of at least one connector element to be abuttingly attached to an edge of the board and to enable said round part to rotate said board into any angular position for connecting same to another board to which at least one other connecting element is abuttingly engaged.

2. The element as set forth in claim 1, in which the opening is circular in cross-section.

3. The element as set forth in claim 1 in which an edge extends from the right angle along the width of the element, and flat surfaces corresponding in length to the height of an edge of the board or plate to be connected extend from the edge to join the circumferential surface of the ring.

4. The element as set forth in claim 3 in which the flat surfaces are provided with at least one slot.

5. The element as set forth in claim 3 in which the flat surfaces are provided with at least one pluglike projection.

6. The element as set forth in claim 2 which further comprises a plurality of through-going openings arranged on a circle co-axial with said circular opening, said plurality of openings having the same cross-section.

7. The element as claimed in claim 3, in which one of the flat surfaces is set back to form an undercut.

8. The element as set forth in claim 1, in which the material of which the element is formed is wood.

9. The element as set forth in claim 1, in which the element is formed of plastic material.

10. A structure comprising a board or plate including means joining thereof to a similar board or plate, said means including a plurality of connection elements, each element comprising a ring having a cross-section of three-quarter of a circle with a right-angular point, formed by straight tangentially joining the ends of the three-quarter circle, said element including a throughgoing circular opening co-axial with the ring for reception of a mating pin, one of the straight sides of each element being fastened to an edge of one of said boards or plates.

11. The structure as set forth in claim 10 in which at least two connection elements spaced from one another, are fastened to at least one edge of the structure.

12. An assembly of at least two structures as set forth in claim 11 in which the connection elements of both structures are aligned with respect to the throughgoing opening, but angularly staggered with respect to the right angular parts thereof, and the connection elements of one structure are arranged to fill the space between the connection elements of the other structure, the assembly further comprising a rod traversing the circular openings of all connection elements, wherein the three-quarter portion of the connectors of the two structures in the joint are constructed to cooperate with one another.

13. A structure comprising a board or plate including means for joining thereof to a similar board or plate, said means including at least one connection element fastened to at least one edge of the structure, said element comprising a ring having a cross-section of three-quarter of a circle with a right angular point, the straight sides thereof tangentially joining the ends of the three-quarter circle, said element including a throughgoing opening co-axial with the ring, at least two connection elements spaced from one another being fastened to at least one edge of the structure, and including an assembly of at least two structures as set forth in which the connection elements of both structures are aligned with respect to the throughgoing opening, but angularly staggered with respect to the right angular parts thereof, and the connection elements of one structure are arranged to fill the space between the connection elements of the other structure, the assembly further comprising a rod traversing the circular openings of all connection elements, wherein the three-quarter portion of the connectors of the two structures in the joint are constructed to cooperate with one another.

14. The assembly as set forth in claim 13 in which one connection element comprises a fixing pin therethrough, whereby rotation of the rod relative to the connection elements is prevented.

* * * * *